United States Patent
Thompson et al.

(10) Patent No.: US 12,064,781 B2
(45) Date of Patent: Aug. 20, 2024

(54) AUTOMATED MACHINES THAT INCLUDE HOSE ATTACHMENT MANIFOLDS FOR HOSE MANAGEMENT

(71) Applicant: Toyota Motor Engineering & Manufacturing North America, Inc., Plano, TX (US)

(72) Inventors: Jesse Howard Thompson, Georgetown, KY (US); Devin Cole Harris, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 209 days.

(21) Appl. No.: 17/397,430

(22) Filed: Aug. 9, 2021

(65) Prior Publication Data

US 2023/0041079 A1    Feb. 9, 2023

(51) Int. Cl.
| | |
|---|---|
| *B05B 13/04* | (2006.01) |
| *B05B 12/14* | (2006.01) |
| *B05B 15/14* | (2018.01) |
| *B25J 9/00* | (2006.01) |
| *B25J 15/00* | (2006.01) |

(52) U.S. Cl.
CPC ...... *B05B 13/0431* (2013.01); *B05B 12/1454* (2013.01); *B05B 15/14* (2018.02); *B25J 9/0009* (2013.01); *B25J 15/0019* (2013.01)

(58) Field of Classification Search
USPC ............. 118/321, 323; 901/43; 239/694
See application file for complete search history.

(56) References Cited

U.S. PATENT DOCUMENTS

| | | | | |
|---|---|---|---|---|
| 2004/0060510 | A1* | 4/2004 | Ciarelli | B05B 7/1404 |
| | | | | 239/113 |
| 2009/0017212 | A1* | 1/2009 | Clifford | B05B 13/0431 |
| | | | | 427/294 |
| 2009/0166478 | A1 | 7/2009 | Choi | |
| 2015/0321210 | A1* | 11/2015 | Fiala | B25J 11/0075 |
| | | | | 901/1 |
| 2019/0022851 | A1* | 1/2019 | Konno | B25J 19/0025 |
| 2019/0091641 | A1* | 3/2019 | Bonner | B29B 7/325 |

FOREIGN PATENT DOCUMENTS

| | | |
|---|---|---|
| JP | 2009142918 A | 7/2009 |
| KR | 100811236 B1 | 3/2008 |
| KR | 101152934 B1 | 6/2012 |
| KR | 102253730 B1 | 5/2021 |

* cited by examiner

*Primary Examiner* — Yewebdar T Tadesse
(74) *Attorney, Agent, or Firm* — Dinsmore & Shohl LLP

(57) ABSTRACT

A robotic arm includes a tool located at an end of the robotic arm that delivers a material to a surface. A hose attachment manifold is mounted to the robotic arm. The hose attachment manifold includes an array of openings that extend through a manifold body of the hose attachment manifold. Fittings are mounted to the manifold body and within the openings. A plurality of upstream hoses are mounted to the fittings at a side of the manifold body. A plurality of downstream hoses are mounted to the fittings at an opposite side of the manifold body. The plurality of downstream hoses are fluidly connected to the tool for delivering a fluid material received from the plurality of upstream hoses.

6 Claims, 6 Drawing Sheets

AUTOMATED MACHINES THAT INCLUDE HOSE ATTACHMENT MANIFOLDS FOR HOSE MANAGEMENT

TECHNICAL FIELD

The present specification generally relates to automated machines, and more specifically, automated machines that include hose attachment manifolds for hose management.

BACKGROUND

A number of automated machines (e.g., industrial robots) are available for various assembly functions within automobile assembly lines. As an example, automated machines may be used for picking target objects, for example, from a bin or other location and placing the objects at a different, preselected location. As another example, automated machines may be used for welding, such as resistance spot welding. As yet another example, automated machines may be used to apply paint or other materials to surfaces.

In the material application example, a number of hoses may be used to deliver the material to a tool that is used to apply the material. As the automated machine moves along multiple axes, the hoses can become tangled or otherwise placed in a bind. In some situations, the hoses may rupture or break resulting in loss of material that may need cleaned, requiring operator time and a need to stop operation of the automated machine.

Accordingly, a need exists for industrial robots with hose attachment manifolds that provide hose management.

SUMMARY

In one embodiment, a robotic arm includes a tool located at an end of the robotic arm that delivers a material to a surface. A hose attachment manifold is mounted to the robotic arm. The hose attachment manifold includes an array of openings that extend through a manifold body of the hose attachment manifold. Fittings are mounted to the manifold body and within the openings. A plurality of upstream hoses are mounted to the fittings at a side of the manifold body. A plurality of downstream hoses are mounted to the fittings at an opposite side of the manifold body. The plurality of downstream hoses are fluidly connected to the tool for delivering a fluid material received from the plurality of upstream hoses.

In another embodiment, a method of managing hoses that deliver a fluid material to a tool of a robotic arm is provided. The method includes mounting a hose attachment manifold to a side of the robotic arm. The hose attachment manifold includes a manifold body, openings that extend through the manifold body and fittings mounted to the manifold body and within the openings. A plurality of upstream hoses are fluidly connected to the fittings at a side of the manifold body. A plurality of downstream hoses are fluidly connected to the fittings at an opposite side of the manifold body and connecting the plurality of downstream hoses to a tool at an end of the robotic arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed automated machines that include a hose attachment manifold having a manifold body with an array of openings to which hose fittings are attached on opposite sides of the manifold body. The hose attachment manifold fluidly connects a plurality of upstream hoses to a plurality of downstream hoses using the fittings and provides a junction between the upstream and downstream hoses at a location that is exterior to the robot arm. In this way, the hose attachment manifold allows use of both upstream and downstream hoses instead of continuous hoses, which can provide for additional slack in the hoses and also control movement of the hoses at potentially problematic locations along the automated machines.

Figure 1:
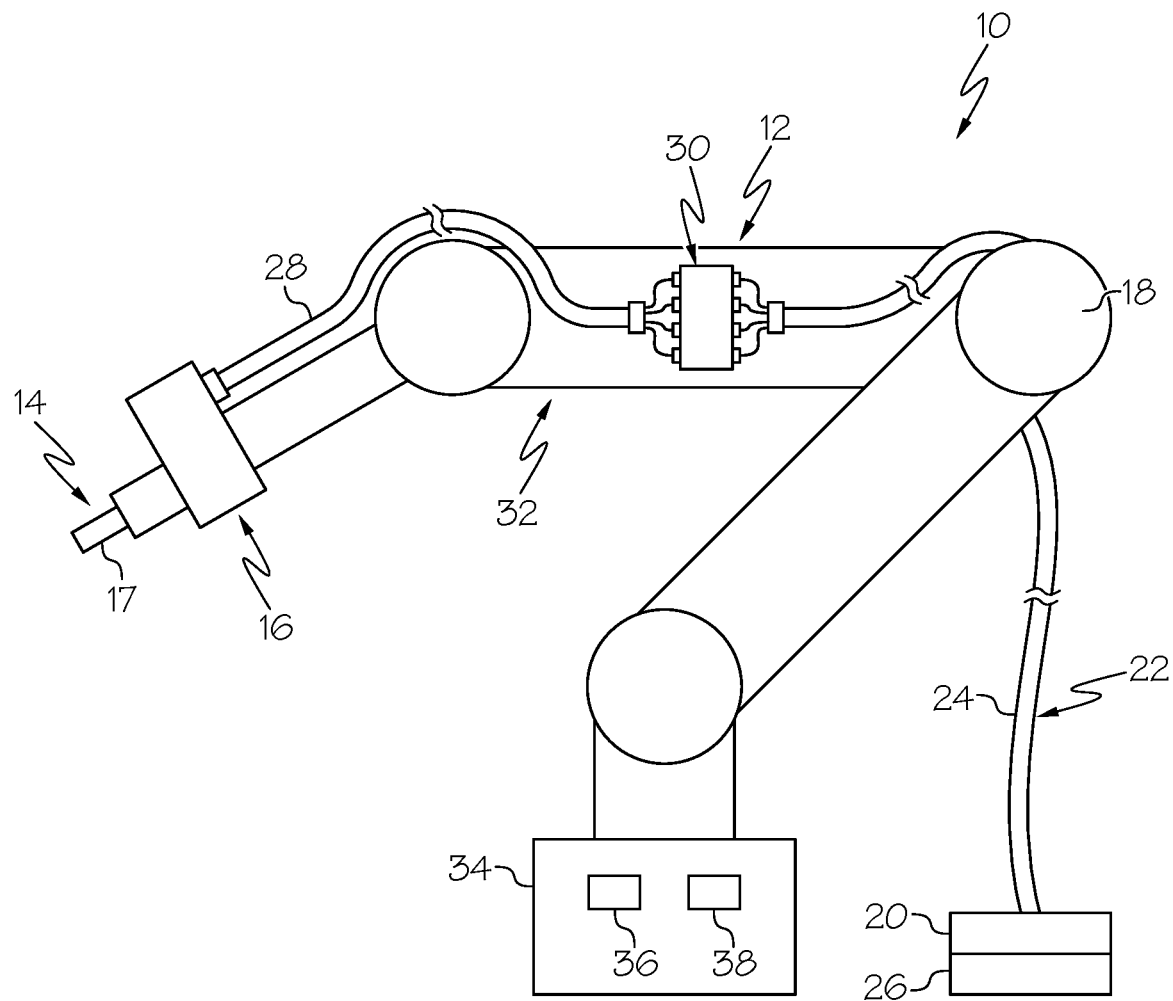
FIG. 1 illustrates a side view of an automated machine comprising a robotic arm including a hose attachment manifold, according to one or more embodiments shown and described herein.

Referring to FIG. 1, an automated machine 10 includes a robotic arm 12 with a tool 14 that is located at an end portion 16 of the robotic arm 12. In the illustrated example, the automated machine 12 is a painting robot that is configured for applying a paint material to a surface, such as a body of a vehicle. As used herein, the term "robot" refers to a machine that is programmable to perform a series of actions automatically. The robotic arm 12 may include a number of joints 18 that allow the robotic arm 12 to pivot, rotate and/or translate. At each joint 18, there may be a servo motor that moves the robotic arm 12 at the respective joint 18 and an encoder (i.e., a sensor) that can be used to detect an angle of the robotic arm 12.

The robotic arm 12 further includes the tool 14 that is located at the end portion 16 of the robotic arm 12. The tool 14 may be, for example, a paint spray gun that includes a nozzle 17 that atomizes and applies the paint material to the surfaces. The tool 14 may be connected to a material supply 20 (e.g., paint supply) by one or more hoses 22. In some embodiments, the hoses 22 may be grouped together in a bundle 24. The hoses 22 that are connected directly to the material supply 20 may be referred to as upstream hoses 22. Some of the upstream hoses 22 may be connected to the material supply 20 and others of the upstream hoses 22 may be connected to some other material supply 26, such as a pressurized air source. As will be described in greater detail below, the upstream hoses 22 are fluidly connected to downstream hoses 28 by a hose attachment manifold 30. The hose attachment manifold 30 may be mounted at a location on the robotic arm 12, such as within a wrist region 32. The hose attachment manifold 30 may be mounted at any suitable location along the robotic arm 12 where it is desired to provide a junction between hoses 22, 28.

A control system 34 may be part of or communicatively coupled to the robotic arm 12 for controlling movement of the motors and receiving signals from the sensors. The control system 34 can acquire the signals from the sensors and control the various motors thereby moving the robotic arm 12 including the tool 14 along a path. The control system 34 may include one or more computers, processors 36, etc. that can be programmed using logic saved in memory 38 to perform any of the functions described herein.

Figure 2:
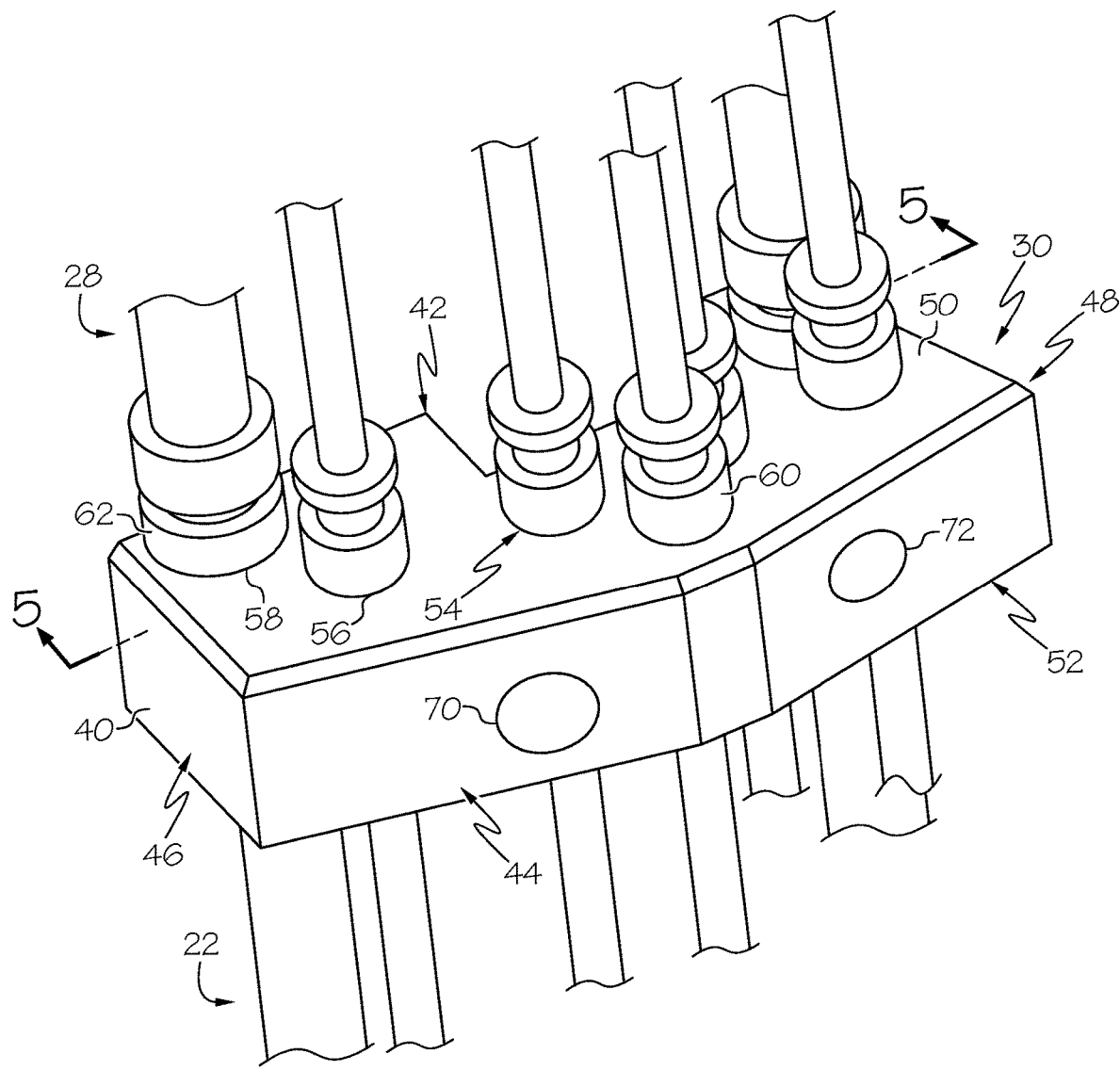
FIG. 2 is a perspective view of the hose attachment manifold of FIG. 1, according to one or more embodiments shown and described herein.
Figure 3:
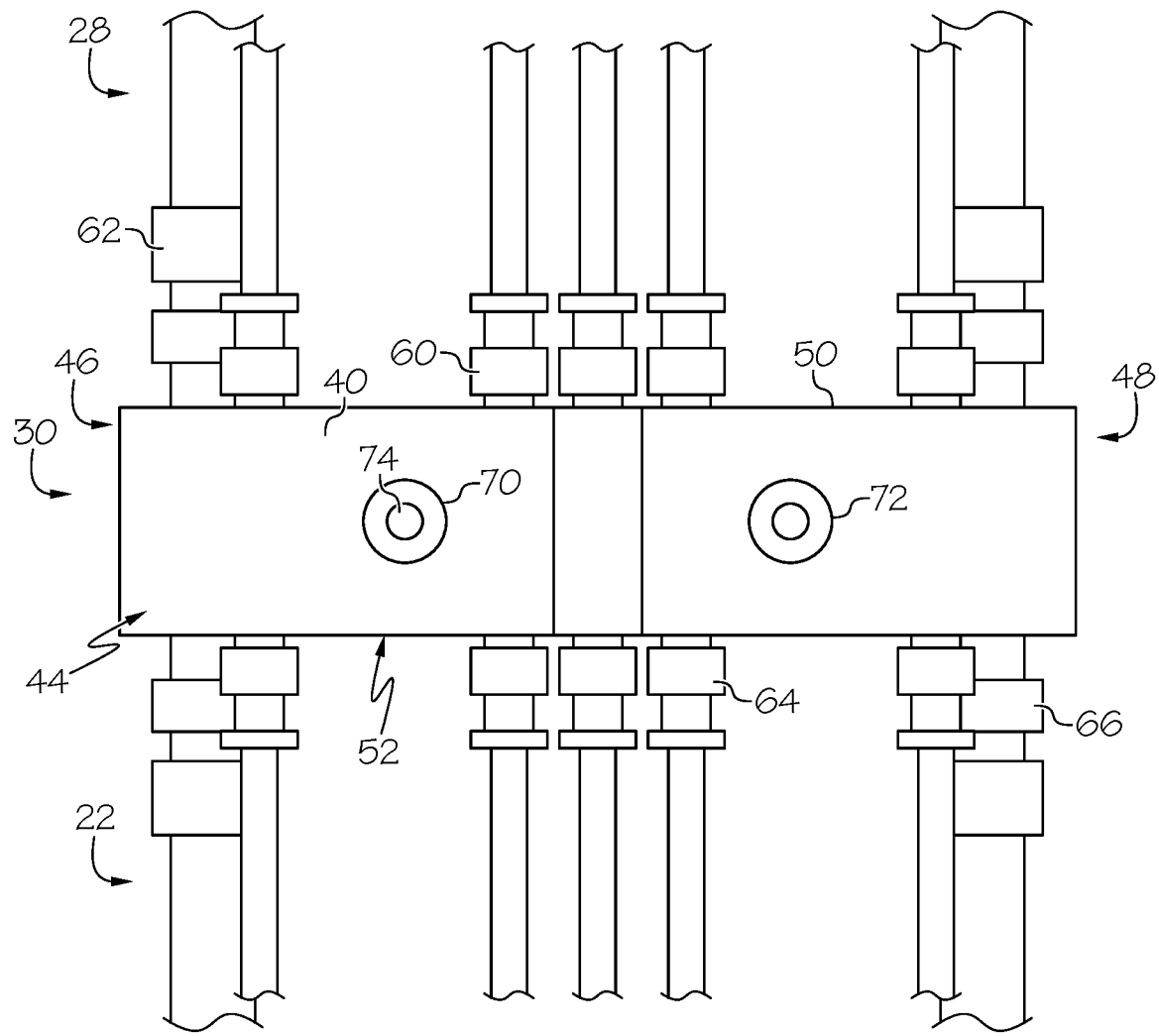
FIG. 3 is a side view of the hose attachment manifold of FIG. 1, according to one or more embodiments shown and described herein.

Referring to FIGS. 2 and 3, the hose attachment manifold 30 is illustrated forming the junction between the upstream hoses 22 and the downstream hoses 28. The hose attachment manifold 30 includes a manifold body 40 that includes an inner side 42 that mounts against the robotic arm 12, an outer side 44 that faces away from the inner side 42 and opposite edges 46 and 48 that extend between the inner and outer sides 40 and 42.

Figure 4:
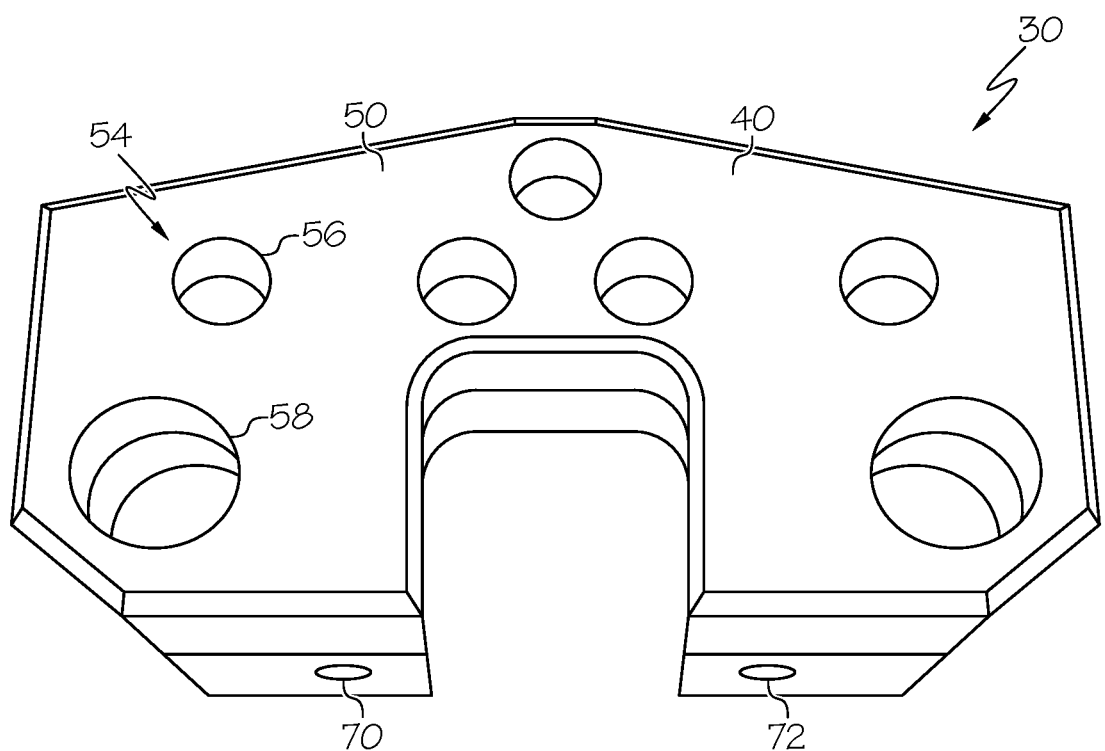
FIG. 4 is another side view of the hose attachment manifold of FIG. 3, according to one or more embodiments shown and described herein.

The hose attachment manifold 30 further includes a downstream facing side 50 and an upstream facing side 52. Referring also to FIG. 4, an array 54 of openings 56 and 58 extend through the manifold body 40 and between the downstream facing side 50 and the upstream facing side 52. As can be seen, in some embodiments, the openings 56 and 58 may be different diameters. In other embodiments, the openings may all be substantially the same size. The openings 56 and 58 are sized to receive fittings 60, 62, 64 and 66 that connect to the upstream hoses 22 and the downstream hoses 28. The fittings 60 and 64 may be sized and configured to receive relatively smaller diameter hoses 22, 28 and the fittings 62 and 66 may be sized and configured to receive relatively larger diameter hoses 22, 28. Mounting openings 70 and 72 extend through the manifold body 40 from the outer side 44 to the inner side 42 through which fasteners 74 can be inserted and mounted to the robotic arm 12.

Figure 5:
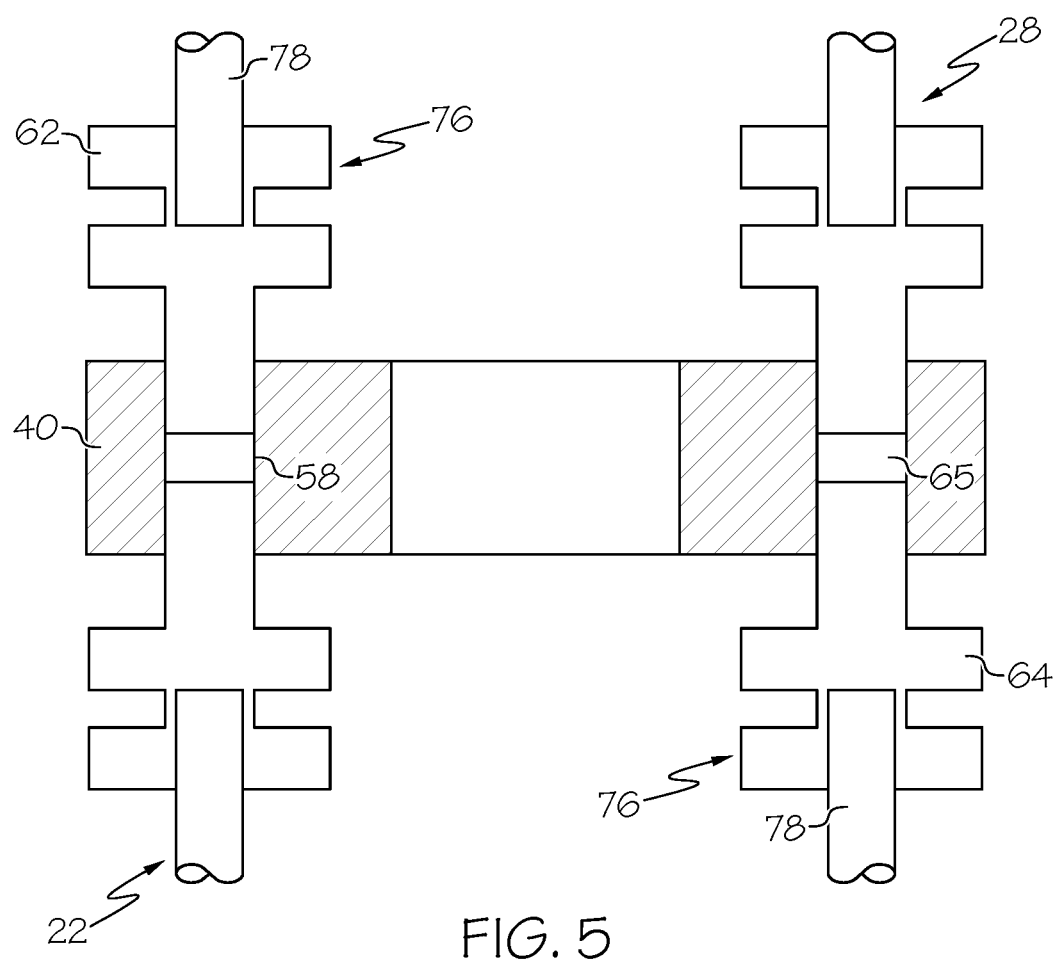
FIG. 5 is a section view of the hose attachment manifold along line 5-5 of FIG. 2, according to one or more embodiments shown and described herein.

Referring briefly to FIG. 5, the fittings (only fittings 62 and 66 are shown) may be mounted to the manifold body 40 and partially within the openings 58 such that connecting ends 76 of the fittings 62 and 66 are exposed outside the manifold body 40 in order to receive terminal ends 78 of the upstream and downstream hoses 22 and 28. In some embodiments, the fittings 62 and 66 may be different fittings and be spaced-apart such that the manifold body 40, itself, forms part of a fluid passageway 65 through the manifold body 40. In other embodiments, the fittings 62 and 66 may be formed together and extend continuously through the openings 58 thereby forming the fluid passageway 65 through the manifold body 40. In either case, the upstream and downstream hoses 22 and 28 terminate at the manifold body 40 and do not extend continuously through the fluid passageways 65 through the manifold body 40.

The hose attachment manifold 30 may be formed by any suitable material, such as a stainless steel or other metal, plastic or a combination of materials. The hose attachment manifold 30 may be formed using any suitable method or combination of methods, such as casting and machining.

Figure 6:
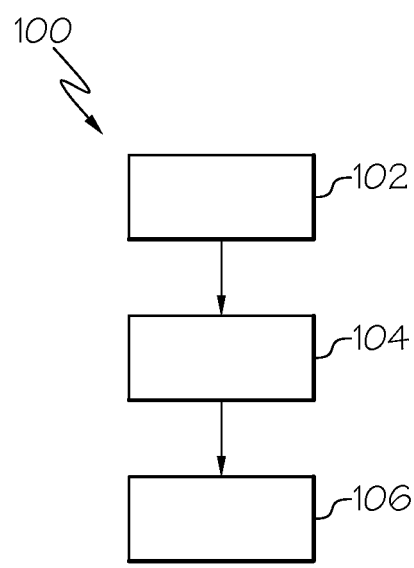
FIG. 6 illustrates a method of managing hoses that deliver a fluid material to a tool of a robotic arm using a hose attachment manifold, according to one or more embodiments shown and described herein.

Referring to FIG. 6, a method 100 of managing hoses that deliver a fluid material, such as paint, air and/or water, to a tool of a robotic arm is illustrated. The method 100 includes, at step 102, forming the hose attachment manifold 30 including the manifold body 40 and the openings 56 and 58 and mounting the hose attachment manifold 30 to a linkage of the robotic arm 12. At step 104, the fittings 60, 62, 64 and 66 are mounted partially within the openings 56, 58 and fluid-tight seals are formed around the fittings 60, 62, 64 and 66. An epoxy, for example, may be used to mount the fittings 60, 62, 64 and 66. At step 106, the upstream hoses 22 and the downstream hoses 28 are mounted to the fittings 60, 62, 64 and 66. The upstream and downstream hoses 22 and 28 are separated by the hose attachment manifold 30 such that fluid passageways are formed through the openings 56 and 58 with terminal ends 78 of the opposing upstream and downstream hoses 22 and 28 being spaced-apart from each other. The manifold body 40 provides fluid communication between the opposing upstream and downstream hoses 22 and 28.

The above-described hose attachment manifolds can be mounted to existing mounting locations on robotic arms and provide a junction between upstream and downstream hoses. The hose attachment manifolds can reduce movement of the hoses relative to the robotic arm, which can reduce wear on the hoses and reduce the potential for hose rupture. Use of the hose attachment manifolds can allow for replacement of only upstream or downstream portions of an overall hose line, which can make replacement and repair quicker and more efficient. The hose attachment manifolds can facilitate use of longer hoses, which can provide additional slack and more hose length options.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic arm comprising:
   a tool located at an end of the robotic arm that delivers a material to a surface;
   a hose attachment manifold that is mounted to an outer surface of the robotic arm, the hose attachment manifold comprising an array of openings that extend completely through a manifold body of the hose attachment manifold without intersecting each other;
   fittings mounted to the manifold body and within the array of openings, the fittings being exposed outside the outer surface of the robotic arm;
   a plurality of upstream hoses mounted to the fittings at a side of the manifold body outside an outer surface of an upstream facing side of the manifold body; and
   a plurality of downstream hoses mounted to the fittings at an opposite side of the manifold body outside an outer surface of a downstream facing side of the manifold body, the plurality of downstream hoses are fluidly connected to the tool for delivering a fluid material received from the plurality of upstream hoses.

2. The robotic arm of claim 1, wherein the tool comprises a paint spray gun, the fluid material comprising a paint.

3. The robotic arm of claim 1, wherein some of the openings through the manifold body have different diameters than others of the openings through the manifold body.

4. The robotic arm of claim 1, wherein the manifold body forms part of a fluid passageway between the plurality of upstream hoses and the plurality of downstream hoses.

5. The robotic arm of claim 1, wherein some of the plurality of upstream hoses are connected to a first material supply and others of the plurality of upstream hoses are connected to a second material supply.

6. The robotic arm of claim 5, wherein the first material supply comprises a first material and the second material supply comprises a second material that is different than the first material.

\* \* \* \* \*